(12) United States Patent
Kimura et al.

(10) Patent No.: US 11,312,056 B2
(45) Date of Patent: Apr. 26, 2022

(54) TWIN SCREW EXTRUDER

(71) Applicant: THE JAPAN STEEL WORKS, LTD., Tokyo (JP)

(72) Inventors: Yoshitaka Kimura, Hiroshima (JP); Makoto Tojo, Hiroshima (JP); Daigo Saga, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 436 days.

(21) Appl. No.: 16/322,762

(22) PCT Filed: Aug. 4, 2017

(86) PCT No.: PCT/JP2017/028423
§ 371 (c)(1),
(2) Date: Feb. 1, 2019

(87) PCT Pub. No.: WO2018/026000
PCT Pub. Date: Feb. 8, 2018

(65) Prior Publication Data
US 2021/0138711 A1    May 13, 2021

(30) Foreign Application Priority Data
Aug. 4, 2016 (JP) .............................. JP2016-153447

(51) Int. Cl.
*B29C 48/40*  (2019.01)
*B29C 48/405* (2019.01)
(Continued)

(52) U.S. Cl.
CPC .......... *B29C 48/402* (2019.02); *B29C 48/022* (2019.02); *B29C 48/25684* (2019.02);
(Continued)

(58) Field of Classification Search
CPC ... B29C 48/685; B29C 48/686; B29C 48/687; B29B 7/482
See application file for complete search history.

(56) References Cited

U.S. PATENT DOCUMENTS 3,078,512 A * 2/1963 De Haven ............... B29C 48/76
96/196
3,475,787 A * 11/1969 Heston .................... B29C 48/76
425/202
(Continued)

FOREIGN PATENT DOCUMENTS

DE     2249328 B1    2/1974
EP     0513431 A1   11/1992
(Continued)

OTHER PUBLICATIONS

Communication dated Aug. 18, 2020, from the Japanese Patent Office in Application No. 2016-153447.
(Continued)

*Primary Examiner* — Galen H Hauth
(74) *Attorney, Agent, or Firm* — Sughrue Mion, PLLC

(57) ABSTRACT

A twin screw extruder (10) for producing a fiber-reinforced resin composition, which is obtained by charging the extruder with a thermoplastic resin and reinforcing fibers in roving form and the reinforcing fibers being fibrillated/cut and being dispersed/kneaded into the thermoplastic resin, comprises: a plate-shaped blade (15), which protrudes from the inner surface of a cylinder (11) and faces a screw (20) and the longitudinal direction of which faces the axial direction of the cylinder; and a height adjustment means (16) for adjusting the gap between the blade (15) and the screw (20).

9 Claims, 3 Drawing Sheets

(51) Int. Cl.
*B29C 48/25* (2019.01)
*B29C 48/285* (2019.01)
*B29C 48/54* (2019.01)
*B29C 48/55* (2019.01)
*B29C 48/63* (2019.01)
*B29C 48/68* (2019.01)
*B29C 48/685* (2019.01)
*B29C 48/00* (2019.01)

(52) U.S. Cl.
CPC .......... *B29C 48/2886* (2019.02); *B29C 48/40* (2019.02); *B29C 48/405* (2019.02); *B29C 48/54* (2019.02); *B29C 48/55* (2019.02); *B29C 48/63* (2019.02); *B29C 48/682* (2019.02); *B29C 48/687* (2019.02)

(56) References Cited

U.S. PATENT DOCUMENTS

| | | | | |
|---|---|---|---|---|
| 3,836,127 A | * | 9/1974 | Csongor | B29C 48/67 366/82 |
| 3,856,278 A | | 12/1974 | Eisenmann | |
| 4,136,968 A | * | 1/1979 | Todd | B29B 7/90 366/85 |
| 5,362,146 A | * | 11/1994 | Nogossek | B29C 48/92 366/82 |
| 6,428,728 B1 | * | 8/2002 | Sakai | B29C 48/687 264/171.13 |
| 2010/0271901 A1 | | 10/2010 | Yamaguchi et al. | |
| 2016/0214277 A1 | | 7/2016 | Saga et al. | |

FOREIGN PATENT DOCUMENTS

| | | |
|---|---|---|
| EP | 3037233 A1 | 6/2016 |
| JP | 54-084370 U | 11/1979 |
| JP | 60002329 A | 1/1985 |
| JP | 02089606 A | 3/1990 |
| JP | 2005-225051 A | 8/2005 |
| JP | 2005-255733 A | 9/2005 |
| JP | 2009-113246 A | 5/2009 |
| JP | 2009-242616 A | 10/2009 |
| JP | 2016-087896 A | 5/2016 |
| WO | 2015025800 A1 | 2/2015 |

OTHER PUBLICATIONS

Communication dated Apr. 20, 2020 from the European Patent Office in application No. 17837101.9.
International Search Report (PCT/ISA/210), issued by International Searching Authority in corresponding International Application No. PCT/JP2017/028423, dated Sep. 26, 2017.
Written Opinion (PCT/ISA/237) issued by the International Searching Authority in corresponding International Application No. PCT/JP2017/028423, dated Sep. 26, 2017.

* cited by examiner

[FIG. 1]
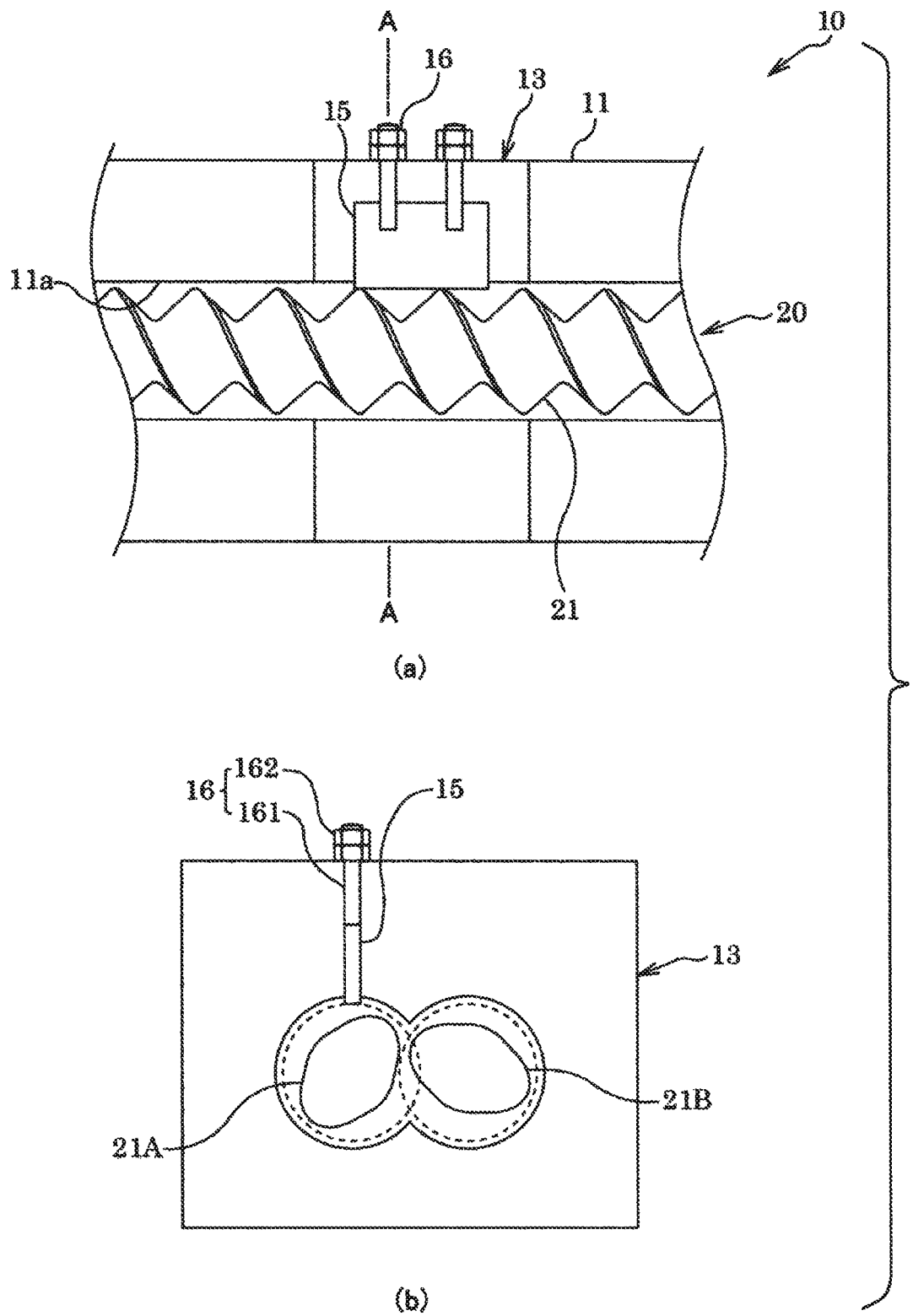

[FIG. 2]
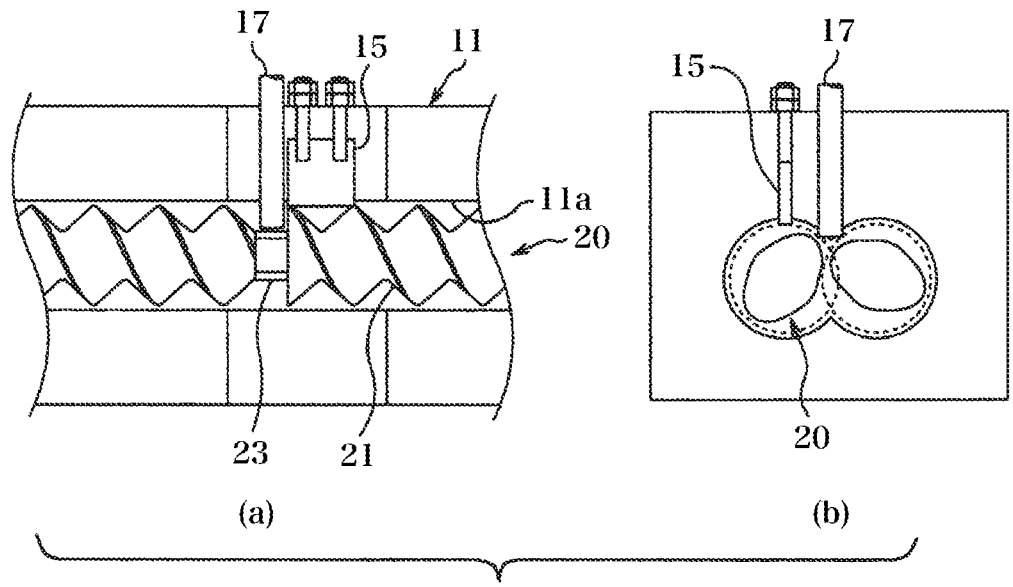
(a)  (b)
[FIG. 3]
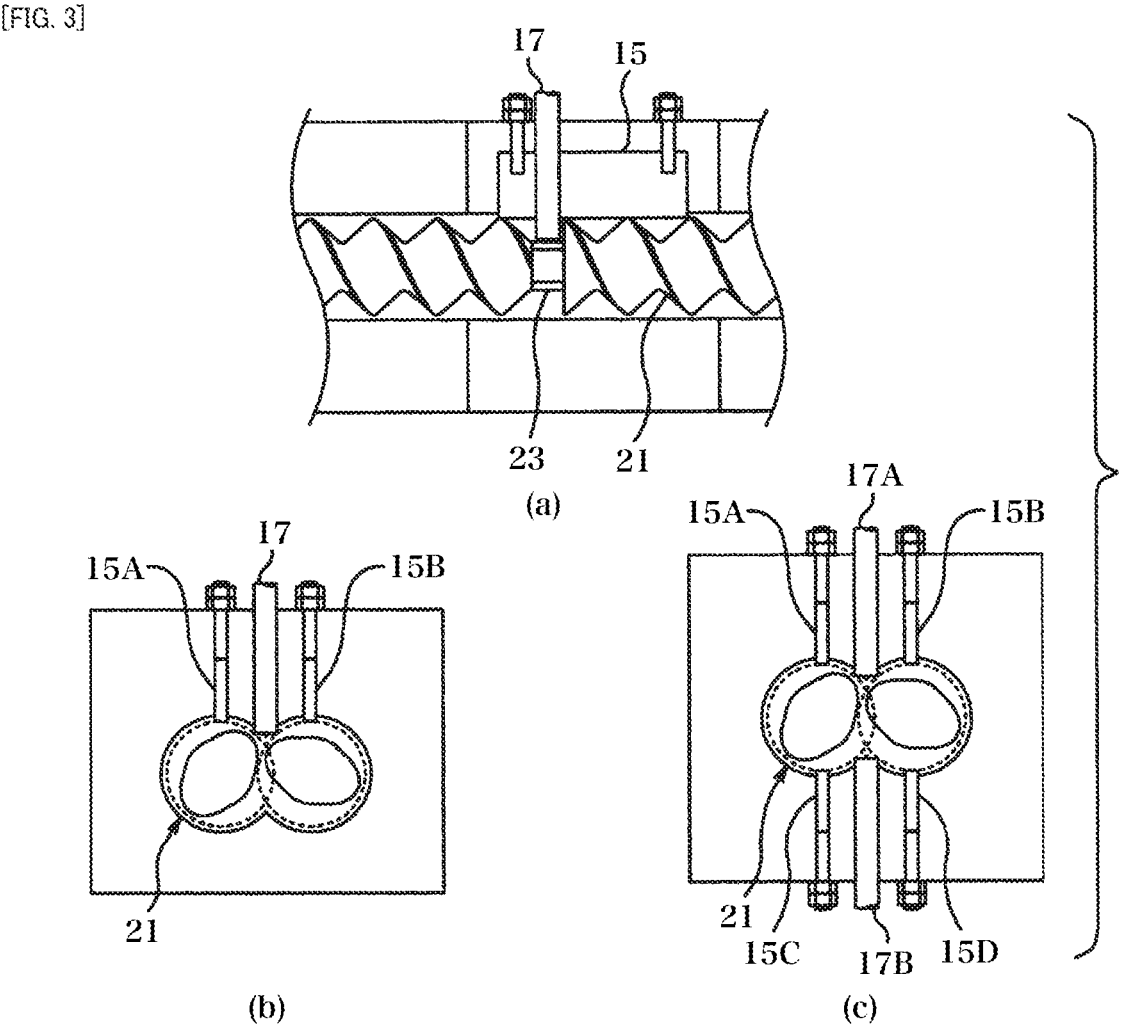
(a)
(b)  (c)

[FIG. 4]
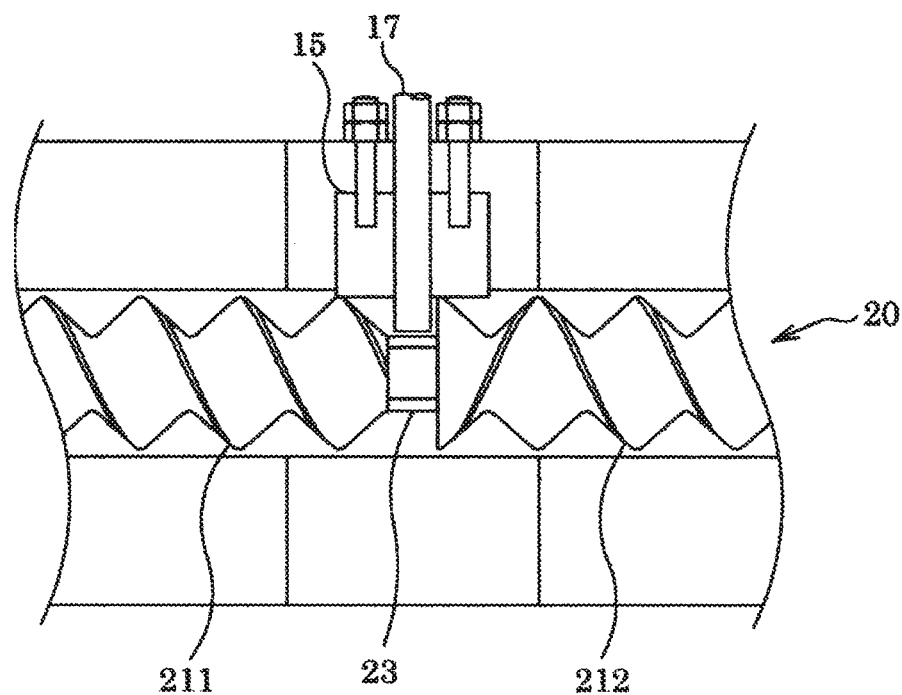

TWIN SCREW EXTRUDER

TECHNICAL FIELD

The present invention relates to a twin screw extruder capable of molding a fiber-reinforced resin composition in which a thermoplastic resin and roving-like reinforced fibers are kneaded, in which a fiber length is suitably long, and which includes reinforced fibers having a predetermined length.

BACKGROUND ART

Fiber-reinforced resins are excellent in specific strength, moldability, and the like, so that fields of application thereof are expanding. In automobile components expected to be mass-produced, the application range of fiber-reinforced resins is gradually expanding from special automobiles or particular components, and promotion of application to general automobile components is required. In fiber-reinforced resins used in general automobile components and the like, it is preferable that the fiber length of reinforced fibers is lengthened and the reinforced fiber content is increased.

For example, PTL 1 proposes a molded article for an automobile underhood structure portion which is an injection molded article of a fiber-reinforced thermoplastic resin composition and in which the length of reinforcing fibers in the molded article is within a range of 1.5 to 5.0 mm and weight average distribution is within a range of 2% to 50%. This molded article for an automobile underhood structure portion has a necessary minimum fiber length, has excellent moldability and weld strength, and has excellent mechanical strength.

In addition, various methods and devices for lengthening the fiber length of reinforced fibers and increasing the reinforced fiber content have been proposed. For example, PTL 2 proposes a resin injection molded article that is injection-molded with a thermoplastic resin in which reinforced fibers and a granular solid are incorporated. In the resin injection molded article, the granular solid has an aspect ratio set within a range of 1 to 5, an average grain size set to 10 μm or shorter, and a blending quantity set within a range of 0.5 to 5 weight %. PTL 2 discloses Examples in which a fiber-reinforced resin molded article using glass fibers or carbon fibers as reinforced fibers and having a matrix of polypropylene or a polyamide resin are prepared by three methods. A first method is a method of performing injection-molding using a pellet processed from rovings of reinforced fibers impregnated with a matrix resin. A second method is a method of performing injection-molding using a chopped pellet obtained by melting, kneading, and extruding reinforced fibers in a chopped strand state and a matrix resin with a twin screw extruder and by cutting and molding an extrusion with a pelletizer. A third method is a method of melting, kneading, and extruding a matrix resin and rovings of reinforced fibers upon being fed in a twin screw extruder, and performing injection-molding immediately upon extrusion. Test results show that the weight average fiber lengths of the reinforced fibers in the injection molded articles become longer in the order from the third method to the second method to the first method.

PTL 3 proposes a producing method for a fiber-reinforced thermoplastic resin composition produced by a twin screw extruder which melts and kneads a thermoplastic resin and continuous reinforced fibers. The producing method for a fiber-reinforced thermoplastic resin composition employs a twin screw extruder including a part A that is provided on a downstream side beyond a supply position of the reinforced fibers, cuts the continuous reinforced fibers, and controls the reinforced fiber length; and a part B that is provided on the downstream side of the part A and disperses the cut reinforced fibers. The reinforced fibers are supplied from a position at which the thermoplastic resin in the twin screw extruder is in a melted state, the continuous reinforced fibers are cut at the part A, and the cut reinforced fibers are dispersed at the part B. In this producing method, in order to cut reinforced fibers and to control the reinforced fiber length, it is preferable that the part A is constituted of parts having a shape including a cutting edge for cutting the reinforced fibers in the same direction as a screw axis direction and the part B is constituted of screw parts having a shape including a notch portion on a screw flight. In the part A, continuous reinforced fibers which have moved forward while being wound around a screw are cut due to engagement of the parts constituting the part A, so that the fiber length in the composition is controlled. The fiber length of the reinforced fibers is determined depending on the number of cutting edges, the distance between the cutting edges, the number of parts, and the like in the part A.

PTL 4 proposes a twin screw extruder for producing a fiber-reinforced resin composition obtained by causing a screw to sequentially transport a melted thermoplastic resin and roving-like reinforced fibers to a transportation portion, a kneading portion, and a rear transportation portion inside a cylinder, such that the reinforced fibers are defibrated and cut to be dispersed and kneaded in the thermoplastic resin. The twin screw extruder includes a protrusion member which is suspended from a cylinder neck portion of the cylinder to the kneading portion. According to this twin screw extruder, the protrusion member entwines reinforced fibers having a predetermined length or longer to promote cutting of the reinforced fibers. Therefore, the fiber length of reinforced fibers of the fiber-reinforced resin composition can be lengthened and can be within a predetermined range. Thus, it is possible to efficiently produce a fiber-reinforced resin composition having uniform characteristics.

CITATION LIST

Patent Literature

PTL 1: JP-A-2005-255733
PTL 2: JP-A-2009-242616
PTL 3: JP-A-2005-225051
PTL 4: JP-A-20016-87896

SUMMARY OF INVENTION

Technical Problem

As disclosed in PTL 1, the length and the content of reinforced fibers are factors affecting mechanical strength or moldability of a fiber-reinforced resin composition.

Therefore, in order to obtain a fiber-reinforced resin composition with reinforced fibers having a desired length and a desired content, various methods have been proposed as disclosed in PTL 2 to PTL 4.

In a method of melting, kneading, and extruding a matrix resin and rovings of reinforced fibers while feeding them to a twin screw extruder, as disclosed in PTL 2, it is not always possible to obtain a fiber-reinforced resin composition in which long reinforced fibers are dispersed. However, a twin screw extruder is preferably adopted as means for cutting reinforced fibers. In addition, the method of melting and kneading a matrix resin and rovings of reinforced fibers while feeding them to a twin screw extruder, is a preferable method having high production efficiency. However, in a producing method disclosed in PTL 3, it is disclosed that the fiber length of the reinforced fibers is determined depending on the number of cutting edges, the distance between the cutting edges, the number of parts, and the like in a part A, but the specific contents thereof are not clear. In addition, in the producing method disclosed in PTL 3, a screw of the part A is constituted of parts having a cutting edge for cutting reinforced fibers, but the specific contents thereof are not clear. On the other hand, if it is intended that cutting will be restrained and the fiber length will be lengthened, reinforced fibers having a fiber length exceeding a predetermined fiber length increase. Therefore, in a twin screw extruder disclosed in PTL 4, such long fibers are entwined around a protrusion member and cutting is promoted.

Generally, carbon fibers are handled in a form that is referred to as a tow in which fiber bundles referred to as filaments constituted of a large number of single fibers (the thickness of the single fibers is within a range of 5 to 7 μm) are further bundled into filaments whose number is within a range of one thousand to tens of thousands. A tow is classified based on the number of its filaments. A tow having 24,000 or less filaments is referred to as a regular tow or a small tow, and a tow having 40,000 or more filaments is referred to as a large tow. A significant factor for reinforced fibers fed in a state of rovings to be cut inside a twin screw extruder is based on a shearing force received when a fiber bundle (a filament) passes through a gap between screws or a gap between a screw flight tip and a cylinder inner wall. Therefore, the size of these gaps has to be designed in consideration of the amount of reinforced fibers to be fed.

However, devices in the related art have no mechanism for adjusting the gap between screws and between cylinders by changing the amount of reinforced fibers to be used as a raw material. In addition, even in a case where a device is operated under the same condition, both the cylinder and the screw are abraded due to long-term use of the device, so that the gap amount may deviate from the proper value at the time of design. In this case, an appropriate cutting power of reinforced fibers is not achievable, so that a desirable fiber-reinforced resin composition cannot be obtained.

In consideration of such problems in the related art, an object of the present invention is to provide a twin screw extruder for producing a fiber-reinforced resin composition upon supplying a thermoplastic resin and rovings of reinforced fibers to the twin screw extruder. The twin screw extruder can produce a fiber-reinforced resin composition which has a suitably long fiber length, contains reinforced fibers having a length within a predetermined range and with uniform characteristics, regardless of the kind or the amount of the reinforced fibers to be used.

Solution to Problem

The foregoing object is achieved by the following configurations.

(1) A twin screw extruder for producing a fiber-reinforced resin composition, in which a thermoplastic resin and roving-like reinforced fibers are fed and the reinforced fibers are defibrated and cut to be dispersed and kneaded in the thermoplastic resin, the extruder comprising:

a plate-shaped blade protruding from an inner surface of a cylinder and facing a screw, a length direction of the blade being directed in a cylinder axis direction; and height adjustment means for adjusting a gap between the blade and the screw.

(2) The twin screw extruder according to the above (1), further comprising, on an upstream side of the blade, a torpedo screw, and a protrusion member suspended from a cylinder neck portion of the cylinder to face the torpedo screw.

(3) The twin screw extruder according to the above (2), wherein the torpedo screw and the protrusion member are provided in an intermediate portion of a full-flight screw.

(4) The twin screw extruder according to the above (2), wherein the torpedo screw and the protrusion member are provided in a joint portion of the full-flight screw and a reverse flight screw.

(5) A twin screw extruder comprising a plate-shaped blade protruding from an inner surface of a cylinder and facing a screw, a length direction of the blade being directed in the cylinder axis direction, wherein the blade is configured such that a gap between the blade and the screw is adjustable.

(6) The twin screw extruder according to the above (5), wherein a length of the blade is 1 D or longer, where D is an inner diameter of the cylinder.

(7) The twin screw extruder according to the above (5), wherein a length of the blade is equal to or greater than a set pitch of screw elements of the screw.

(8) A cylinder for a twin screw extruder comprising a plate-shaped blade protruding from an inner surface of the cylinder in a direction perpendicular to a cylinder axis, a length direction of the blade being directed in a cylinder axis direction.

(9) The cylinder for a twin screw extruder according to the above (8), wherein the blade comprises height adjustment means for adjusting a height protruding from the inner surface of the cylinder.

The cylinder used in the twin screw extruder is highly useful. That is, a cylinder for a twin screw extruder having the plate-shaped blade, which protrudes from the inner surface of the cylinder in a direction perpendicular to the cylinder axis and of which the length direction is directed in the cylinder axis direction, can also be used not only in a case of promoting cutting of reinforced fibers but also in a case of adjusting kneading of a kneading mixture. It is preferable that the blade in this cylinder has the height adjustment means for adjusting a height protruding from the inner surface of the cylinder.

Advantageous Effects of Invention

According to the twin screw extruder of the present invention, reinforced fibers entwined in the protrusion member can be reliably cut, and reinforced fibers which are unnecessarily long and insufficiently cut can be prevented from being mixed. Therefore, it is possible to efficiently produce a fiber-reinforced resin composition which has a suitably long fiber length, contains reinforced fibers having a length within a predetermined range, and has uniform characteristics.

BRIEF DESCRIPTION OF DRAWINGS

FIG. 1 illustrates cut surfaces of a main part of a twin screw extruder according to the present invention, wherein: FIG. 1(a) is a longitudinal sectional view; and FIG. 1(b) is a cross-sectional view illustrating a cross-section taken along line A-A in FIG. 1(a).

FIG. 2 is sectional views of the main part of the twin screw extruder having blades, a protrusion member, and a torpedo screw, wherein: FIG. 2(a) is a longitudinal sectional view; and FIG. 2(b) is a cross-sectional view.

FIG. 3 is sectional views of the main part of the twin screw extruder in examples differing in the length of the blade, and the number of blades or the number of protrusion members, wherein: FIG. 3(a) is a longitudinal sectional view of a modification example in which the length of the blade is changed; FIG. 3(b) is a cross-sectional view of a modification example including a pair of blades and one protrusion member; and FIG. 3(c) is a cross-sectional view of a modification example including a pair of blades and one protrusion member in both an upper portion and a lower portion of a cylinder.

FIG. 4 is a longitudinal sectional view of the main part of the twin screw extruder in which screw elements facing the blades and the protrusion member are a full-flight screw and a reverse flight screw.

DESCRIPTION OF EMBODIMENTS

Hereinafter, an embodiment of the present invention will be described based on the drawings. FIG. 1 illustrates sectional views of main parts of a twin screw extruder according to the present invention. FIG. 1(a) is a longitudinal sectional view, and FIG. 1(b) is a cross-sectional view. The twin screw extruder according to the present invention is used as a twin screw extruder for producing a fiber-reinforced resin composition, in which a thermoplastic resin and roving-like reinforced fibers (reinforced fibers in a state of rovings) are fed to the extruder and the reinforced fibers are defibrated and cut to be dispersed and kneaded in the thermoplastic resin. As illustrated in FIG. 1, this twin screw extruder 10 includes a plate-shaped blade 15 which protrudes from an inner surface 11a of a cylinder 11 and faces a screw 20 and whose length direction is directed in the cylinder axis direction. The twin screw extruder 10 includes height adjustment means 16 for adjusting the gap between the blade 15 and the screw 20.

This twin screw extruder 10 is characterized by being provided with the blade 15 having the height adjustment means 16 in the cylinder 11 as described above. This blade 15 is provided in a blade case 13 embedded in the cylinder 11. The blade 15 has a plate shape directed in the axis direction of the screw 20 and protrudes from the inner surface 11a of the cylinder 11 to face the screw 20. It is favorable that the length of the blade 15 is one pitch or longer than a disposition pitch of screw elements 21 facing the blade 15 of the screw 20. Here, one pitch is a distance between apex portions of the screw elements 21 adjacent to each other along the axis direction. According to this configuration, the blade 15 may temporarily face the screw elements 21 in two places in the axis direction at the same time. It is favorable that the length of the blade 15 is one pitch or longer than the disposition pitch of the screw elements 21. According to this configuration, since the blade 15 faces a portion between the apex portions of screw elements 21 in at least one place at all times, it is possible to avoid erroneous adjustment of the protruding amount of the blade 15 from the inner surface 11a of the cylinder 11 to exceed the limit of the protruding amount, which will be described below.

The gap between the blade 15 and the screw elements 21 can be adjusted by the height adjustment means 16. The gap is adjusted in accordance with the total amount of reinforced fibers used as a raw material. Accordingly, reinforced fibers transported by the screw 20 inside the cylinder 11 are favorably defibrated and cut by the blade 15 and the screw elements 21.

It is needless to mention that the protruding amount of the blade 15 from the inner surface 11a of the cylinder 11 is required to be adjusted by the height adjustment means 16 within a range where the protruding amount does not reach the limit of the protruding amount, at which the tip of the blade 15 comes into contact with the screw elements 21. In a case where the cut condition of fibers is deteriorated due to abrasions of the screw elements 21 or the blade 15, it is desirable that the device is temporarily disassembled, the abrasion amount of each member is exactly measured, and the limit of the protruding amount is reset.

The height adjustment means 16 need only be able to finely adjust the protruding amount of the blade 15 from the inner surface 11a of the cylinder 11. For example, as illustrated in FIG. 1, the height adjustment means 16 can be constituted of a bolt 161 and a nut 162. The bolt 161 is fixed to the blade 15, and the blade 15 vertically moves in association with rotation of the nut 162. If the position of the blade 15 is fixed, the nut 162 is locked. In a case where roving-like reinforced fibers to be fed are substantially uniform, the protruding amount of the blade 15 from the inner surface 11a of the cylinder 11 can be substantially uniform, so that the height adjustment means 16 can be omitted.

In order to further promote defibration and cutting of reinforced fibers, a protrusion member 17 can be provided on an upstream side of the blade 15 (FIG. 2(a)). As illustrated in FIG. 2(b), the protrusion member 17 is provided to face the screw 20 from a cylinder neck portion (an intermediate part between a pair of screws 20). For example, the protrusion member 17 has a cylindrical shape or a prism shape. This protrusion member 17 can cause reinforced fibers having a predetermined length or longer to be temporarily entwined around the protrusion member 17 and to stop by generating turbulence in the kneading mixture of reinforced fibers and a thermoplastic resin which have been transported. Accordingly, reinforced fibers are defibrated and cut by the blade 15 and the screw elements 21 on a downstream side of the protrusion member 17, and cutting of reinforced fibers is promoted. Reinforced fibers which are unnecessarily long and insufficiently cut are prevented from being generated.

The shape and the protruding length of the protrusion member 17 to be suspended are timely selected in accordance with the range of the length of reinforced fibers in the fiber-reinforced resin composition molded by the twin screw extruder 10. It is favorable that the protruding length of the protrusion member 17 to be suspended from the inner surface 11a of the cylinder 11 is adjustable. In order to easily adjust the protruding length of the protrusion member 17 to be suspended, it is favorable that screw elements facing the protrusion member 17 are torpedo screws 23. "Torpedo screw" refers to a screw element which has a short diameter and whose outer diameter portion has no flight.

In addition, the degree of defibration and cutting of reinforced fibers can be adjusted by the length of the blade 15, the number of blades 15, and the number of protrusion members 17. For example, as illustrated in FIG. 3(a), it is possible to provide the blade 15 whose length extends over several pitches (for example, three pitches) of the screw element 21. In this case, since cutting places of reinforced fibers increase, cutting of reinforced fibers is promoted. In a case where a long blade 15 is provided, the protrusion member 17 can be provided in the cylinder neck portion corresponding to a front end part of the blade 15.

The configurations of the blade 15 and the protrusion member 17 can be configurations as illustrated in FIG. 3(b) or 3(c). Defibration and cutting of reinforced fibers can be promoted by providing two or more blades 15, or two or more protrusion members 17. In FIG. 3(b), a blade 15B is provided to form a pair at a position corresponding to a blade 15A of the screw 20. In FIG. 3(c), the blade 15B is provided to form a pair at a position corresponding to the blade 15A of the screw 20, and a blade 15C and a blade 15D are symmetrically provided in an upper portion and a lower portion of the blade case 13.

The blade 15 and the protrusion member 17 defibrate and cut reinforced fibers which have been transported as described above in cooperation with the screw 20. As illustrated in FIGS. 1 to 3, the screw elements 21 of the screw 20 facing the blade 15 or the protrusion member 17 can be a full-flight screw. In addition, as illustrated in FIG. 4, the protrusion member 17 and the torpedo screw 23 can be arranged in a coupling part between a full-flight screw 211 and a reverse flight screw 212. In addition, defibration and cutting of reinforced fibers are promoted by providing the reverse flight screw 212.

Hereinabove, the present invention has been described. According to the present invention, the fiber length of reinforced fibers can be suitably long and can be within a predetermined range by using the twin screw extruder. In addition, it is possible to preferably produce a fiber-reinforced resin composition including no reinforced fibers having a predetermined length or longer. In addition, the cylinder 11 according to this twin screw extruder has the plate-shaped blade 15 of which the length direction is directed in the cylinder axis direction, and the kneading state, the kneading degree, or the like of a kneading mixture can be adjusted by adjusting the gap between the blade 15 and the screw 20 (the screw elements 21). In such a case, the shape of the blade 15 suitable for kneading adjustment, and the kind or the shape of the screw elements facing the blade 15 are selected.

The present invention is not limited to the embodiment described above, and modifications, improvements, and the like can be suitably made. Moreover, the material, the shape, the dimensions, the numerical value, the form, the number, the disposition place, and the like of each constituent element in the embodiment described above are optional as long as the present invention can be realized, and are not limited.

The present invention has been described in detail with reference to a particular embodiment. However, it is clear for those skilled in the art that various changes and corrections can be applied without departing from the gist and the scope of the present invention.

This application claims priority based on Japanese Patent Application (No. 2016-153447) filed on Aug. 4, 2016, the content of which is incorporated herein by reference.

Here, the features of the embodiment of the twin screw extruder and the cylinder for a twin screw extruder according to the present invention described above will be collectively listed below in [1] to [9] in a brief manner.

[1] A twin screw extruder (10) for producing a fiber-reinforced resin composition, in which a thermoplastic resin and roving-like reinforced fibers are fed and the reinforced fibers are defibrated and cut to be dispersed and kneaded in the thermoplastic resin, the extruder comprising:

a plate-shaped blade (15) protruding from an inner surface of a cylinder (11) and facing a screw (20), a length direction of the blade (15) being directed in a cylinder axis direction; and height adjustment means for adjusting a gap between the blade (15) and the screw (20).

[2] The twin screw extruder (10) according to the above [1], further comprising, on an upstream side of the blade (15), a torpedo screw (23), and a protrusion member (17) suspended from a cylinder neck portion of the cylinder (11) to face the torpedo screw (23).

[3] The twin screw extruder (10) according to the above [2], wherein the torpedo screw (23) and the protrusion member (17) are provided in an intermediate portion of a full-flight screw (211).

[4] The twin screw extruder (10) according to the above [2], wherein the torpedo screw (23) and the protrusion member (17) are provided in a joint portion of the full-flight screw (211) and a reverse flight screw (212).

[5] A twin screw extruder (10) comprising a plate-shaped blade (15) protruding from an inner surface of a cylinder (11) and facing a screw (20), a length direction of the blade (15) being directed in the cylinder axis direction, wherein the blade (15) is configured such that a gap between the blade (15) and the screw (20) is adjustable.

[6] The twin screw extruder according to the above [5], wherein a length of the blade (15) is 1 D or longer, where D is an inner diameter of the cylinder (11).

[7] The twin screw extruder (10) according to the above [5], wherein a length of the blade is equal to or greater than a set pitch of screw elements of the screw.

[8] A cylinder (11) for a twin screw extruder comprising a plate-shaped blade (15) protruding from an inner surface of the cylinder (11) in a direction perpendicular to a cylinder axis, a length direction of the blade being directed in a cylinder axis direction.

[9] The cylinder (11) for a twin screw extruder according to the above [8], wherein the blade (15) comprises height adjustment means (16: bolt 161, nut 162) for adjusting a height protruding from the inner surface of the cylinder (11).

INDUSTRIAL APPLICABILITY

According to the present invention, it is possible to provide a twin screw extruder for producing a fiber-reinforced resin composition obtained by supplying a thermoplastic resin and ravings of reinforced fibers to the twin screw extruder. The twin screw extruder can produce a fiber-reinforced resin composition which has a suitably long fiber length, contains reinforced fibers having a length within a predetermined range, and has uniform characteristics, regardless of the kind or the amount of the reinforced fibers to be used. The present invention exhibiting such effects is useful in the field of twin screw extruders.

REFERENCE SIGNS LIST

10: Twin screw extruder
11: Cylinder
13: Blade case
15: Blade
16: Height adjustment means
161: Bolt
162: Nut
17: Protrusion member
20: Screw
21: Screw elements 211: Full-flight screw
212: Reverse flight screw
23: Torpedo screw

The invention claimed is:

1. A twin screw extruder for producing a fiber-reinforced resin composition, in which a thermoplastic resin and roving-like reinforced fibers are fed and the reinforced fibers are defibrated and cut to be dispersed and kneaded in the thermoplastic resin, the extruder comprising:
    a plate-shaped blade protruding from an inner surface of a cylinder toward helical screw elements having a pitch, a length of the blade being directed in a screw axis direction is greater than the pitch; and
    a height adjuster configured to adjust a gap between the blade and the screw.

2. The twin screw extruder according to claim 1, further comprising, on an upstream side of the blade,
    a torpedo screw; and
    a protrusion member suspended from a cylinder neck portion of the cylinder to face the torpedo screw.

3. The twin screw extruder according to claim 2, wherein the torpedo screw and the protrusion member are provided in an intermediate portion of a full-flight screw.

4. The twin screw extruder according to claim 2, wherein the torpedo screw and the protrusion member are provided in a joint portion of the full-flight screw and a reverse flight screw.

5. The twin screw extruder according to claim 1, wherein a length of the blade is 1 D or longer, where D is an inner diameter of the cylinder.

6. The cylinder for a twin screw extruder according to claim 1, wherein an inner edge of the plate-shaped blade member nearest the cylindrical axis is a straight edge.

7. The cylinder for a twin screw extruder according to claim 1, wherein the plate-shaped blade protrudes inward toward the cylinder axis further than the inner surface of the cylinder.

8. A cylinder for a twin screw extruder comprising:
    A plate-shaped blade protruding inward toward helical screw elements along a screw axis further than an inner surface of the cylinder in a direction perpendicular to the screw axis, a length direction of the blade being directed in the screw axis direction is greater than a set pitch of screw elements of the screw.

9. The cylinder for a twin screw extruder according to claim 8, wherein the blade comprises a height adjuster configured to adjust a height protruding from the inner surface of the cylinder.

* * * * *